US011210616B2

(12) United States Patent
Brahms et al.

(10) Patent No.: US 11,210,616 B2
(45) Date of Patent: *Dec. 28, 2021

(54) ASSET ALLOCATION EVALUATION SYSTEM

(71) Applicant: Palantir Technologies Inc., Palo Alto, CA (US)

(72) Inventors: Christopher Brahms, Vienna, VA (US); Eric Knudson, Washington, DC (US); Mitchell Beard, Falls Church, VA (US); Patrick Lii, Brooklyn, NY (US); Sophia Turrell, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,523

(22) Filed: Jun. 4, 2019

(65) Prior Publication Data

US 2019/0295016 A1    Sep. 26, 2019

Related U.S. Application Data

(63) Continuation of application No. 15/225,629, filed on Aug. 1, 2016, now Pat. No. 10,380,522.

(Continued)

(51) Int. Cl.
*G06Q 10/06* (2012.01)
*H04L 29/06* (2006.01)
*H04L 29/08* (2006.01)

(52) U.S. Cl.
CPC ....... *G06Q 10/06312* (2013.01); *H04L 67/10* (2013.01); *H04L 67/42* (2013.01)

(58) Field of Classification Search
CPC .... G06Q 10/06312; H04L 67/10; H04L 67/42

(Continued)

(56) References Cited

U.S. PATENT DOCUMENTS 5,568,390 A    10/1996  Hirota et al.
5,857,329 A    1/1999   Bigham (Continued)

FOREIGN PATENT DOCUMENTS

EP    0652513 A1    5/1995
EP    1926074 A1    5/2008

(Continued)

OTHER PUBLICATIONS

Eazystock Inventory Optimization Software. Published Oct. 15, 2014. Retrieved from https://web.archive.org/web/20141015021754/http://www.eazystock.com/overview.*

(Continued)

*Primary Examiner* — Timothy Padot
(74) *Attorney, Agent, or Firm* — Schwegman Lundberg & Woessner, P.A.

(57) ABSTRACT

A system and method for presenting information for evaluating asset allocation. In example embodiments, the method includes determining a readiness score associated with a request location and in response to determining the readiness score associated with the request location transgresses a threshold readiness score, causing display of an alert notification within a user interface. The method further includes receiving a request submitted via the user that specifies a requested quantity of the asset type to be allocated to the request location. Based on the request, the user interface displays a fulfillment indicator to indicate a portion of the requested quantity of the asset type that is fulfilled based on combination of reallocation quantities of the asset type to be (Continued)

allocated to the request location from each destination location in a set of destination locations.

17 Claims, 12 Drawing Sheets

Related U.S. Application Data

(60) Provisional application No. 62/274,072, filed on Dec. 31, 2015.

(58) Field of Classification Search
USPC ........................................................ 705/7.12
See application file for complete search history.

(56) References Cited

U.S. PATENT DOCUMENTS

| | | | |
|---|---|---|---|
| 5,902,349 A | 5/1999 | Endo et al. | |
| 6,496,774 B1 | 12/2002 | Davies | |
| 6,608,559 B1 | 8/2003 | Lemelson et al. | |
| 7,603,229 B2 | 10/2009 | Goldberg et al. | |
| 7,818,291 B2 | 10/2010 | Ferguson et al. | |
| 7,941,321 B2 | 5/2011 | Greenstein et al. | |
| 8,042,110 B1 | 10/2011 | Kawahara et al. | |
| 8,046,283 B2 | 10/2011 | Burns et al. | |
| 8,108,138 B2 | 1/2012 | Bruce et al. | |
| 8,352,174 B2 | 1/2013 | Milstein et al. | |
| 8,417,409 B2 | 4/2013 | Bast et al. | |
| 8,650,101 B1* | 2/2014 | Glustrom | G06Q 10/087 705/29 |
| 8,713,476 B2* | 4/2014 | Martyn | H04M 1/72469 715/808 |
| 8,763,078 B1 | 6/2014 | Castellucci et al. | |
| 8,786,605 B1 | 7/2014 | Curtis et al. | |
| 9,092,482 B2 | 7/2015 | Harris et al. | |
| 9,280,532 B2 | 3/2016 | Cicerone et al. | |
| 10,380,522 B1 | 8/2019 | Brahms et al. | |
| 2002/0186144 A1* | 12/2002 | Meunier | G07B 15/00 340/4.6 |
| 2004/0153418 A1 | 8/2004 | Hanweck | |
| 2005/0209732 A1 | 9/2005 | Audimoolam et al. | |
| 2006/0241856 A1 | 10/2006 | Cobleigh et al. | |
| 2007/0038506 A1* | 2/2007 | Noble | G06Q 10/08 705/13 |
| 2007/0088596 A1 | 4/2007 | Berkelhamer et al. | |
| 2007/0168217 A1* | 7/2007 | Weas | G06Q 30/0278 705/307 |
| 2007/0198571 A1 | 8/2007 | Ferguson et al. | |
| 2007/0220604 A1 | 9/2007 | Long | |
| 2008/0086320 A1* | 4/2008 | Ballew | G06Q 10/0637 705/342 |
| 2008/0301559 A1 | 12/2008 | Martinsen et al. | |
| 2008/0313281 A1 | 12/2008 | Scheidl et al. | |
| 2009/0037912 A1 | 2/2009 | Stoitsev et al. | |
| 2009/0319418 A1 | 12/2009 | Herz | |
| 2010/0162371 A1 | 6/2010 | Geil | |
| 2010/0205662 A1 | 8/2010 | Ibrahim et al. | |
| 2011/0041084 A1 | 2/2011 | Karam | |
| 2011/0050423 A1 | 3/2011 | Cova et al. | |
| 2011/0153592 A1 | 6/2011 | DeMarcken | |
| 2011/0185401 A1 | 7/2011 | Bak et al. | |
| 2012/0101952 A1 | 4/2012 | Raleigh et al. | |
| 2012/0290506 A1 | 11/2012 | Muramatsu et al. | |
| 2013/0036346 A1 | 2/2013 | Cicerone | |
| 2013/0085901 A1 | 4/2013 | Henderson et al. | |
| 2013/0231862 A1 | 9/2013 | Delling et al. | |
| 2013/0286601 A1 | 10/2013 | Shin et al. | |
| 2014/0025414 A1* | 1/2014 | Worden | G06Q 10/06 705/7.12 |
| 2014/0081685 A1 | 3/2014 | Thacker et al. | |
| 2014/0122178 A1* | 5/2014 | Knight | G06Q 30/0202 705/7.31 |
| 2014/0181833 A1 | 6/2014 | Bird et al. | |
| 2014/0200968 A1 | 7/2014 | Yoder et al. | |
| 2015/0120176 A1 | 4/2015 | Curtis et al. | |
| 2015/0261817 A1 | 9/2015 | Harris et al. | |
| 2015/0339595 A1* | 11/2015 | Soutter | G06Q 30/0207 705/5 |
| 2016/0042444 A1* | 2/2016 | Hengelbrock | G06Q 30/0635 705/26.81 |
| 2016/0071138 A1* | 3/2016 | Hill | G06Q 30/0645 705/14.11 |
| 2016/0147730 A1 | 5/2016 | Cicerone | |

FOREIGN PATENT DOCUMENTS

| | | |
|---|---|---|
| EP | 2555126 A2 | 2/2013 |
| EP | 2876587 A1 | 5/2015 |
| WO | WO-2012025915 A1 | 3/2012 |

OTHER PUBLICATIONS

"U.S. Appl. No. 13/196,788, Examiner Interview Summary dated Nov. 25, 2015", 7 pgs.
"U.S. Appl. No. 13/196,788, Non Final Office Action dated Oct. 23, 2015", 20 pgs.
"U.S. Appl. No. 13/196,788, Notice of Allowance dated Dec. 18, 2015", 17 pgs.
"U.S. Appl. No. 13/657,656, Final Office Action dated May 6, 2015", 29 pgs.
"U.S. Appl. No. 13/826,228, Notice of Allowance dated Mar. 27, 2015", 10 pgs.
"U.S. Appl. No. 14/196,814, Non Final Office Action dated May 5, 2015", 24 pgs.
"U.S. Appl. No. 14/302,279, Non Final Office Action dated Sep. 24, 2015", 10 pgs.
"U.S. Appl. No. 14/302,279, Notice of Allowance dated Apr. 5, 2016", 17 pgs.
"U.S. Appl. No. 14/726,211, Non Final Office Action dated Apr. 5, 2016", 15 pgs.
"U.S. Appl. No. 15/225,629, Advisory Action dated Feb. 5, 2019", 4 pgs.
"U.S. Appl. No. 15/225,629, Advisory Action dated Dec. 28, 2017", 3 pgs.
"U.S. Appl. No. 15/225,629, Examiner Interview Summary dated Jul. 30, 2018", 3 pgs.
"U.S. Appl. No. 15/225,629, Examiner Interview Summary dated Dec. 4, 2017", 3 pgs.
"U.S. Appl. No. 15/225,629, Final Office Action dated Oct. 13, 2017", 22 pgs.
"U.S. Appl. No. 15/225,629, Final Office Action dated Nov. 30, 2018", 27 pgs.
"U.S. Appl. No. 15/225,629, First Action Interview—Office Action Summary dated Jan. 11, 2017", 10 pgs.
"U.S. Appl. No. 15/225,629, First Action Interview—Pre-Interview Communication dated Oct. 31, 2016", 8 pgs.
"U.S. Appl. No. 15/225,629, Non Final Office Action dated May 3, 2018", 27 pgs.
"U.S. Appl. No. 15/225,629, Notice of Allowance dated Mar. 27, 2019", 10 pgs.
"U.S. Appl. No. 15/225,629, Response filed Sep. 26, 2017 to Notice of Non-Compliant dated Jul. 31, 2017", 8 pgs.
"U.S. Appl. No. 15/225,629, Response filed Dec. 12, 2017 to Final Office Action dated Oct. 13, 2017", 24 pgs.
"U.S. Appl. No. 15/225,629, Response filed Mar. 23, 2017 First Action Interview—Office Action Summary dated Jan. 11, 2017", 21 pgs.
"U.S. Appl. No. 15/225,629, Response filed Aug. 2, 2018 to Non Final Office Action dated May 3, 2018", 17 pgs.
"U.S. Appl. No. 15/225,629_AARF_01-28-19 to Final Office Action dated Nov. 30, 2018", 18 pgs.
"Canadian Application Serial No. 2,846,414, Office Action dated Apr. 13, 2016", 5 pgs.
"European Application Serial No. 14162372.8, Extended Search Report dated Apr. 30, 2015", 7 pgs.
"German Application Serial No. 102013221052.3, Office Action dated Mar. 24, 2015", w/English Translation, 17 pgs.

(56) References Cited

OTHER PUBLICATIONS

"German Application Serial No. 102013221057.4, Office Action dated Mar. 23, 2015", w/English Translation, 17 pqs.
"Help File for ModelRisk Version 5—Part 1", Vose Software, (2007), 375 pgs.
"Help File for ModelRisk Version 5—Part 2", Vose Software, (2007), 362 pgs.
"Netherlands Application Serial No. 2012436, Search Report dated Nov. 6, 2015", w/ English Translation, 8 pgs.
"New Zealand Application Serial No. 623323, First Examination Report dated Apr. 17, 2014", 2 pgs.
"New Zealand Application Serial No. 623323, Further Examination Report dated Jun. 6, 2014", 2 pgs.
Ashraf, "Protect your Google Account (Gmail) by enabling SMS (text message) notifications for Suspicious Activity", online article from dotTech, Jan. 24, 2013, https://dottech.org/94405/how-to-setup-text-message-sms-google-notifications-for-suspicious-activity/, (Jan. 24, 2013), 4 pgs.
Ballesteros, Francisco, ef al., "Batching: A Design Pattern for Efficient and Flexible Client/Server Interaction", Transaction on Pattern Language of Programming I, (c) Springer-Verlag Berlin Heidelberg 2009, (2009), 48-66.
Bogle, Phillip, et al., "Reducing Cross-Domain Call Overhead Using Batched Futures", SIGPLAN No. 29, 10, OOPSLA ' 94, (Oct. 1994), 341-354.
Chen, Chia-Ying, et al., "A Novel Emergency Vehicle Dispatching System", 2013 IEEE 77th Vehicular Technology Conference, IEEE, (Jun. 2, 2013), 5 pgs.
Eklund, Peter W., et ai., "A Dynamic Multi-source Dijkstra's Algorithm for Vehicle Routing", Intelligent Information Systems, (1996), 5 pgs.
Hart, Peter E., et al., "A Formal Basis for the Heuristic Determination of Minimum Cost Paths". IEEE Transactions on Systems Science and Cybernetics, IEEE, vol. 1, No. 2. (Jul. 1968), 100-107.
Jotshi, Arun, et al., "Dispatching and Routing of Emergency Vehicles in Disaster Mitigation Using Data Fusion", Socio-Economic Planning Sciences, Pergamon, Amsterdam, Netherlands, vol. 43, No. 1, (Mar. 1, 2009), 24 pgs.
Mohring, Rolf H., "Partitioning Graphs to Speedup Dijkstra's Algorithm", ACM Journal of Experimental Algorithmics, Association of Computing Machinery, New York, New York, vol. 11, (Jan. 1, 2006), 29 pgs.
Reedy, Sarah, "Policy and Charging Rules Function (PCRF)", http://www.lightreading.com/document.asp?doc_id=680015 printed Dec. 10, 2013, (Sep. 13, 2010), 4 pgs.
Stamos, James, et al., "Remote Evaluation", ACM Transactions on Programming Languages and Systems, vol. 12, No. 4, (Oct. 1990), 537-565.
Wagner, Dorothea, et al., "Dynamic Shortest Paths Containers", Electronic Notes in Theoretical Computer Science, vol. 92, No. 1, (2003), 19 pgs.
Yang, Shu, "An Enhanced Routing Method with Dijkstra Algorithm and AHP Analysis in GIS-based Emergency Plan", Geoinformatics, 2010 18th International Conference on, IEEE, Piscataway, New Jersey, (Jun. 18, 2010), 6 pgs.
U.S. Appl. No. 15/225,629, U.S. Pat. No. 10/380,522, filed Aug. 1, 2016, Asset Allocation Evaluation System.
U.S. Appl. No. 15/394,599, filed Dec. 29, 2016, Asset Allocation Assessment and Notification System.
"U.S. Appl. No. 15/394,599, Final Office Action dated Jan. 27, 2021", 27 pgs.
"U.S. Appl. No. 15/394,599, Response filed Nov. 2, 20 to First Action Interview—Office Action Summary dated Jul. 31, 2020", 19 pgs.
"U.S. Appl. No. 15/394,599, First Action Interview—Office Action Summary dated Jul. 31, 2020", 29 pgs.
"U.S. Appl. No. 15/394,599, First Action Interview—Pre-Interview Communication dated Jun. 16, 2020", 27 pgs.
"Eazystock Inventory Optimization Software", Syncron Inc., [Online], Retrieved from the Internet: <URL: https://web.archive.org/web/20141015021754/http://www.eazystock.com/overview>, (Oct. 15, 2014), 3 pgs.

\* cited by examiner

◯ LOCATION K

GAPS   RESOLUTION

⊞ SELECT COA
to resolve Location K's gap of 60 requested EARPLUG5s
- ☐ Relocate [20] of 20 EARPLUGS from 1 Location HQ
- ☐ Relocate [26] of 26 EARPLUGS from Location
- ☐ Relocate [30] of 20 EARPLUGS from 3 Location LOG CO
- ☐ Relocate [50] of 124 EARPLUGS from Location F
- ☐ Relocate [28] of 20 EARPLUGS from 1 Location LOG CO
- ☐ Relocate [18] of 18 EARPLUGS from 2 Location HQ
- ☐ Relocate [50] of 122 EARPLUGS from Location I
- ☐ Relocate [24] of 24 EARPLUGS from Location N
- ☐ Relocate [50] of 116 EARPLUGS from Location M
- ☐ Relocate [50] of 74 EARPLUGS from Location D
- ☐ Relocate [8] of 8 EARPLUGS from Location A
- ☐ Relocate [50] of 116 EARPLUGS from Location H
- ☐ Relocate [50] of 74 EARPLUGS from Location C
- ☐ Relocate [50] of 128 EARPLUGS from Location L
- ☐ Relocate [50] of 88 EARPLUGS from Location B
- ☐ Relocate [50] of 124 EARPLUGS from Location G ACQUIRE
- ☐ [1] Additional EARPLUGS FOR $3.74/EA DENY
- ☐ [1] Deny because invalid request.
- ☐ [1] Deny because can't support request.

60 REQUESTED
57 ASSIGNED
0 DENIED
3 LEFT

95%

COST SUMMARY
↦ Allocate EARPLUGS from 2 Location HQ      40
↦ Allocate EARPLUGS from 2 Location INTEL CO  3
↦ Allocate EARPLUGS from 2 Location COMM CO   4

Req 47  Buy $0  Deny 0          [Submit]

FIG. 9

ASSET ALLOCATION EVALUATION SYSTEM

RELATED APPLICATIONS

This application claims the benefit of priority and is a continuation of U.S. patent application Ser. No. 15/225,629, entitled "ASSET ALLOCATION EVALUATION SYSTEM," filed Aug. 1, 2016, which is claims the benefit of priority, under 35 U.S.C. Section 119(e), to U.S. Provisional Application No. 62/274,072, entitled "ASSET ALLOCATION EVALUATION SYSTEM," filed Dec. 31, 2015, which are hereby incorporated by reference in their entireties.

TECHNICAL FIELD

The subject matter disclosed herein generally relates to the technical field of special-purpose machines that facilitate evaluation of allocation of an asset to a location, including computerized variants of such special-purpose machines and improvements to such variants, and to the technologies by which such special purpose machines become improved compared to other special-purpose machines that facilitate evaluation of the allocation of assets to a location.

BACKGROUND

Various systems exist that allow users to allocate assets (e.g., physical assets) to various locations within an organization. These For example, these conventional systems typically allow users to remove assets from a first location in order to allocate the assets to a second location of the organization. Although such systems allow users to select the location from which the asset will be allocated, the user may need to engage in considerable outside research to determine if one location is a better source for the asset over a different location. Further, investigation into the current or future locations of assets and comparison between locations may be overwhelming for a user and may cause the user to needlessly engage in many steps to retrieve data needed to make an informed decision. In addition, this investigation may involve erroneous or redundant machine-implemented requests, data transfers, and other communications that exhaust network resources.

BRIEF DESCRIPTION OF THE DRAWINGS

Some embodiments are illustrated by way of example and not limitation in the figures of the accompanying drawings.

FIG. 9 is an interface diagram depicting a user interface that displays options for allocating assets from various locations, according to some example embodiments.

DETAILED DESCRIPTION

Figure 1:
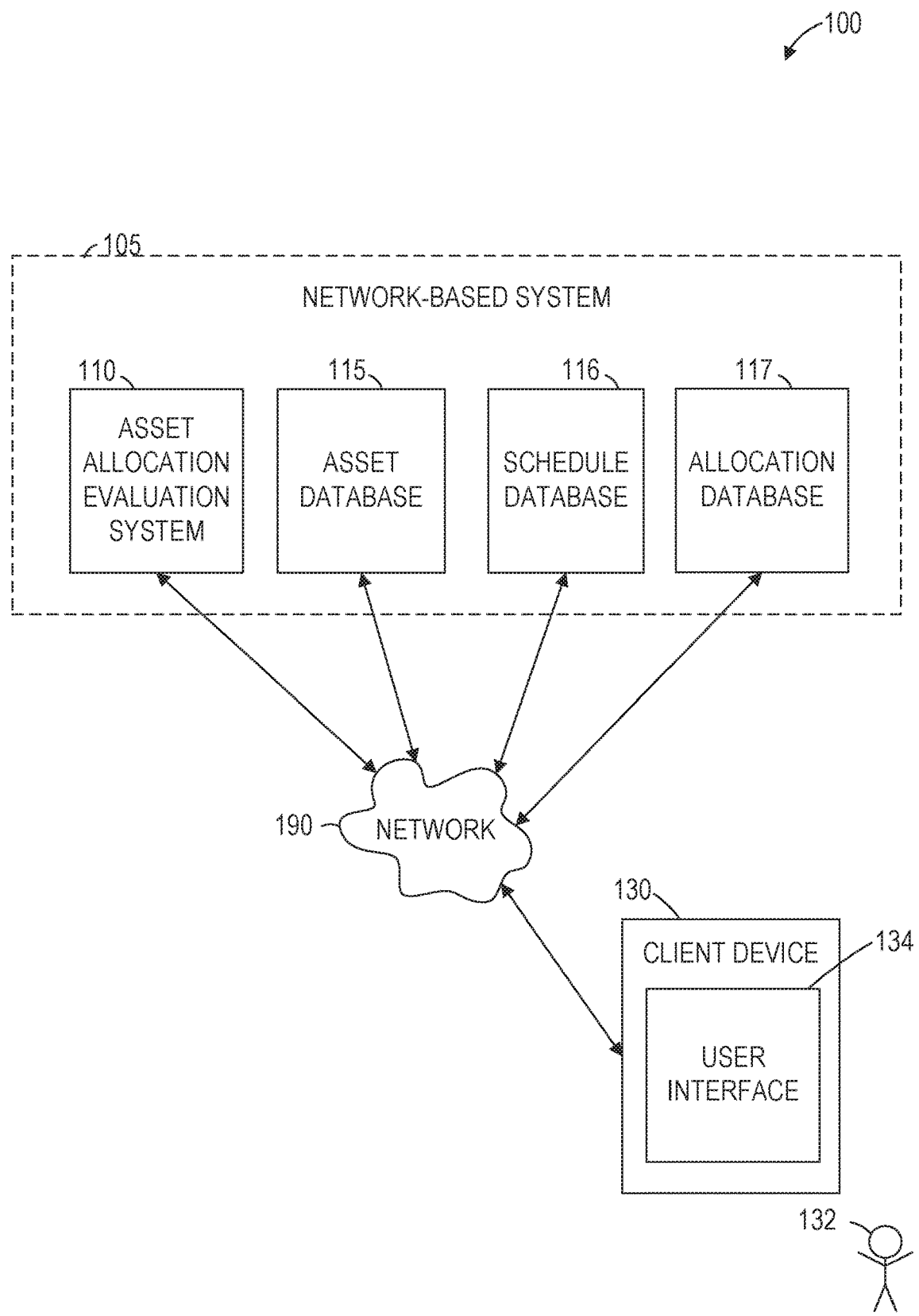
FIG. 1 is a network diagram illustrating an asset allocation evaluation system operating in a network environment, according to some example embodiments.

Reference will now be made in detail to specific example embodiments for carrying out the inventive subject matter of the present disclosure. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the present disclosure relate to systems and methods for an asset allocation evaluation system. In various example embodiments, the asset allocation evaluation system acts as a decision-making tool for a user to evaluate the benefits and detriments associated with allocating an asset (physical supplies or personnel) to a location (geographic or symbolic, e.g. Brooklyn, N.Y. or Brooklyn Bridge construction site) in need of the asset, specifically where the asset is taken (reallocated) away from another location. Further, the asset allocation evaluation system may assess the readiness of a location by forecasting a historic demand for an asset at the location at a designated time compared to the ability of the location to access the asset at the designated time. As described herein, "readiness" refers to how prepared a location is, based on the location's access to various asset types, to carry out obligatory functions or tasks.

An example benefit to displaying the detriments and benefits associated with allocating an asset is that the user is able to understand the specific costs associated with an allocation decision rather than arbitrarily taking an asset away from a location without understanding the consequences of the decision. An example benefit to determining the readiness of the location is that system may provide an alert that that the location will not be ready to access the quantity of the asset forecasted based on the historical demand for the asset such that a user may recognize the deficiency and make the asset type available.

In an example application of the asset evaluation system in a construction setting, a first work site may be a location in need of the asset, in this case a van to transport workers. A foreman may use the asset allocation evaluation system to submit a request for a van to be allocated to the first work site. The asset allocation evaluation system can communicate with data structures to identify a green van that can be allocated to the first work site from a second work site. The asset allocation evaluation system can further display to the foreman an asset record (e.g. e.g. data entry that is correlated to an asset) of a green van as well as a benefit score and a detriment score. The benefit score provides a measure of the benefit to the first work site in acquiring the green van and the detriment score provides a measure of the detriment to the second work site in losing the green van.

The asset allocation evaluation system further may differentiate certain benefits and detriments from others. For example, allocating an asset to a first location may have a benefit in that the first location has a deficiency (gap) in that asset type, but there may also be a detriment, since it will cost transportation resources to physically move the asset from a second location to the first location. On the other hand, the second location may experience a benefit in not having to maintain the asset, but may suffer a detriment because there is a future need for the asset. In this example, the system displays these and other benefits and detriments as textual output on a graphic user interface as well as an overall benefit and detriment.

In another example using the construction setting, the asset allocation system may access a historical demand for transportation vans and forecast that demand for a specific time in the future. The second work site may need additional vans in July because the worksite has historically required extra manpower in the month of July. In the case where additional vans will not be available to the second location in July, the asset allocation system may display an alert notification to the foreman about the upcoming shortfall. Similarly, if the foreman allocates a quantity of vans to be made available to the location for the month of July, and the quantity does not match the demand forecast for July, the system may immediately alert the foreman (e.g. using a display on a graphical user interface) about the non-match. Additionally, the system may alert the foreman about options to mitigate the shortfall, such as assigning substitute workers.

FIG. 1 is a network diagram illustrating an asset allocation evaluation system operating in a network environment, according to some example embodiments. The network environment 100 includes asset allocation evaluation system 110, an asset database 115, a schedule database 116, an allocation database 117, and client device 130, all communicatively coupled to each other via a network 190. The asset allocation evaluation system 110, with or without databases 115, 116, and 117, may form all or part of a network-based system 105 (e.g., a cloud-based server system configured to provide one or more network-based services to the client device 130). The asset allocation evaluation system 110 and the client device 130 may each be implemented in a special-purpose (e.g., specialized) computer system, in whole or in part, as described below with respect to FIG. 9.

Also shown in FIG. 1 is a user 132, who may be a human user (e.g., a human being), a machine user (e.g., a computer configured by a software program to interact with the client device 130), or any suitable combination thereof (e.g., a human assisted by a machine or a machine supervised by a human). The user 132 is associated with the client device 130 and may be a user of the client device 130. For example, the client device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. The client device 132 additionally includes a graphical user interface 134 to facilitate communication with the user 132.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 12 and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
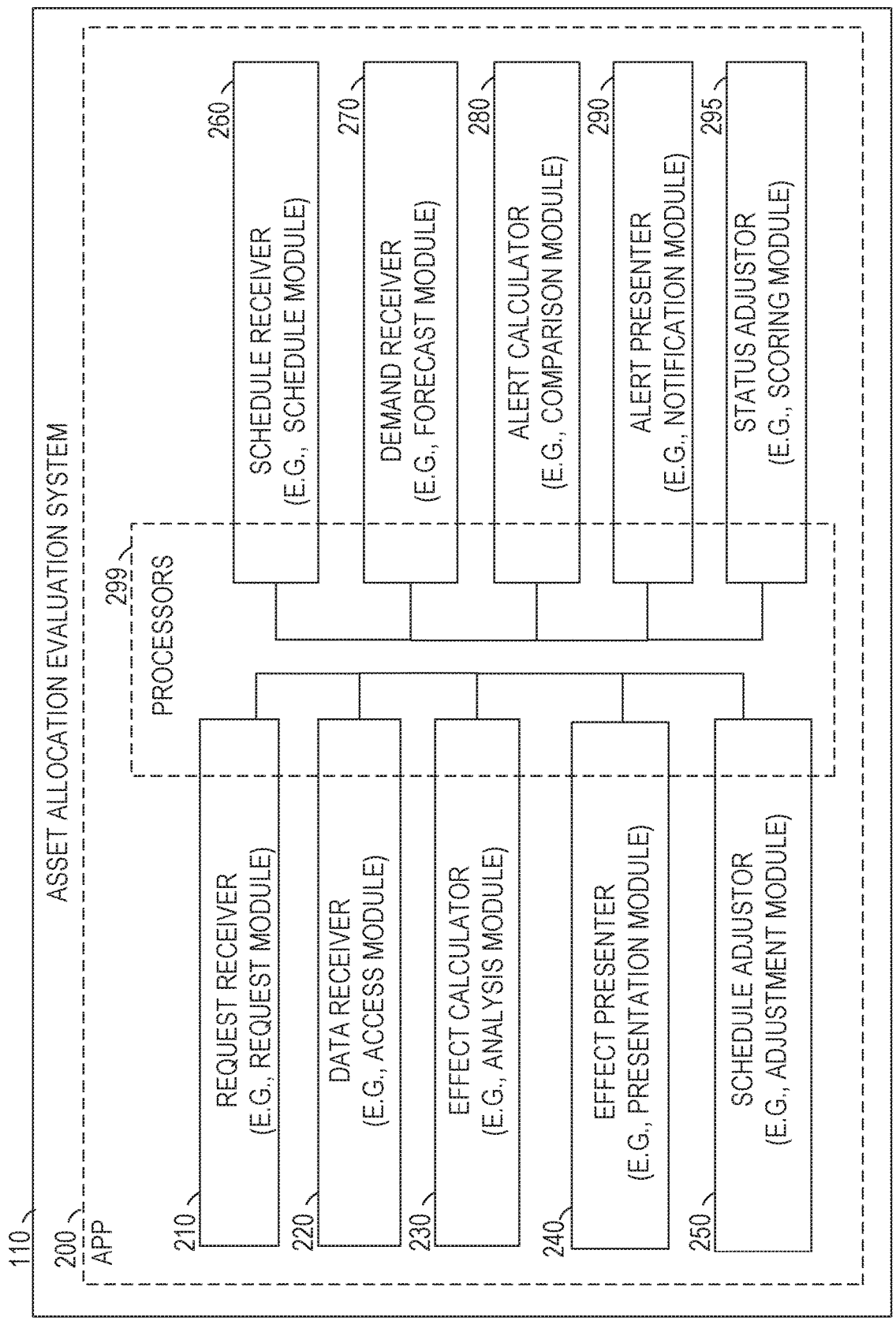
FIG. 2 is a block diagram illustrating components of an asset allocation evaluation system, according to some example embodiments.

FIG. 2 is a block diagram illustrating components of the asset allocation evaluation system 110, according to some example embodiments. The asset allocation evaluation system 110 is shown as including a request receiver 210, a data receiver 220, an effect calculator 230, an effect presenter 240, a schedule adjustor 250, a schedule receiver 260, a demand receiver 270, an alert calculator 280, an alert presenter 290, and a status adjustor 295, all configured to communicate with each other (e.g., via a bus, shared memory, or a switch).

As shown in FIG. 2, the request receiver 210, the data receiver 220, the effect calculator 230, the effect presenter 240, the schedule adjustor 250, schedule receiver 260, demand receiver 270, alert calculator 280, alert presenter 290, and status adjustor 295 may form all or part of an app 200 that is stored (e.g., installed) on the asset allocation evaluation system 110 (e.g., responsive to or otherwise as a result of data being received from the client device 130 via the network 190). Furthermore, one or more processors 299 (e.g., hardware processors, digital processors, or any suitable combination thereof) may be included (e.g., temporarily or permanently) in the app 200, the request receiver 210, the data receiver 220, the effect calculator 230, the effect presenter 240, the schedule adjustor 250, or any suitable combination thereof.

Any one or more of the components (e.g., modules) described herein may be implemented using hardware alone (e.g., one or more of the processors 299) or a combination of hardware and software. For example, functional components described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

The request receiver 210 receives an allocation request (e.g. from the user 132 on the graphical user interface 134 on the client device 130.) The allocation request includes a quantity, an asset type identifier, and a request location. Responsive to receiving the request, the data receiver 220 matches the asset type identifier to an asset record, the record containing an attribute of the asset type. The asset allocation evaluation system 110 further includes a data receiver 220 that accesses, from the asset database 115, a current location of the asset and also accesses, from the schedule database 116, a future location (e.g., a planned location) of the asset.

The effect calculator 230 determines a benefit score and a detriment score based on the allocation of the asset. The effect calculator 230 determines the detriment score by comparing the information about the destination location to information from the allocation database 117 that reflects a model distribution of the asset type within the destination location. Similarly, the effect calculator 230 determines the benefit score by comparing the information about the request location to the information from the allocation database 117 that reflects a model distribution of the asset type within the request location.

The effect calculator 230 may consider numerous metrics for determining detriment and benefit scores. For example, the effect calculator 230 may determine a gap score by measuring the difference between the quantity of the asset type currently at a location and the quantity of the asset type called for by the allocation database 117; the effect calculator 230 may further determine a transport score by calculating the expense in resources needed to transport the asset to the request location or the destination location; the effect calculator 230 may further determine an activity score by calculating the extent to which the asset type is currently used at the destination location or at the request location; and the effect calculator 230 may further determine a location-demand score by calculating the likelihood the request location and the destination location will use assets of the asset type in the future.

The effect presenter 240 presents at least one asset record (e.g. data entry that is correlated to an asset) along with the detriment score or benefit score associated with allocating each asset. After the detriment score is determined by the effect calculator 230, the effect presenter 240 further modifies the graphical user interface 134 to present the detriment score associated with reallocation of the asset from the current location to the request location.

In instances in which the request receiver 210 matches the asset type identifier to multiple asset records, the effect presenter 240 assigns a rank to each asset record based on a comparison of the detriment score and the benefit score associated with reallocation of each asset. The effect presenter 240 further causes a presentation of the asset records in an order reflecting the ranking. In some example embodiments, the effect presenter 240 accesses user preference data to adjust the order.

The schedule adjuster 250 is responsible for adjusting the scheduled location of an asset included in the schedule database 116. The schedule adjustor 250 may modify the schedule database 116 to reflect reallocation of an asset from a current location to a future location responsive to the user 132 selecting the asset record from the graphical user interface 134. For example, after reviewing the benefit and detriment scores associated with allocating an asset to a location, the user 132 selects an option to confirm allocation of the asset to the request location and away from the destination location on the graphical user interface 134. Since the destination location of the asset is changed to a request location, the schedule adjustor 250 adjusts the schedule database 116 to reflect this change.

The schedule receiver 260 accesses a currently scheduled availability, or schedule data, of an asset type at a location at a designated time and communicates the schedule data to the alert calculator 280. The schedule receiver 260 obtains availability information from any one of, or a combination of, data structures 115, 116, and 117. Responsive to a user input or a user request, the schedule receiver 260 communicates the currently scheduled availability to the alert calculator 280.

The demand receiver 270 accesses a historic demand for the location's access to an asset type. The demand receiver 270 receives historic demand data from any one of, or a combination of data structures 115, 116, and 117 and may further communicate the historic demand data to the alert calculator 280 responsive to a user input or a user request.

The alert calculator 280 receives the schedule data from the schedule receiver 260, receives the historic demand data from the demand receiver 270, and compares the scheduled data to the historic demand data. Based on the comparison, the alert calculator 280 determines a readiness score for the scheduled availability of an asset type for a location at a designated time. The alert calculator 280 further determines whether the readiness score transgresses a threshold readiness score. The alert calculator 280 may communicate the transgression of the threshold readiness score by the readiness score as an alert to an alert presenter 290 or a status adjustor 295.

The alert presenter 290 is configured cause presentation of an alert notification. Responsive to receiving communication from the alert calculator 280 that the readiness score transgresses the threshold readiness score, the alert presenter 290 displays a notification correlated with the alert notification within a user interface that specifies the difference between the scheduled data and the historic demand data.

The status adjustor 295 is configured to calculate and adjust an overall readiness score of a plurality of locations related to access to the asset type at the designated time. Responsive to receiving communication from the alert calculator 280 that the readiness score transgresses the threshold readiness score, the status adjustor 295 adjusts the overall readiness score related to the plurality of locations. The status adjustor 295 further adjusts overall readiness score based on the difference between the scheduled data and the historic demand data.

Figure 3:
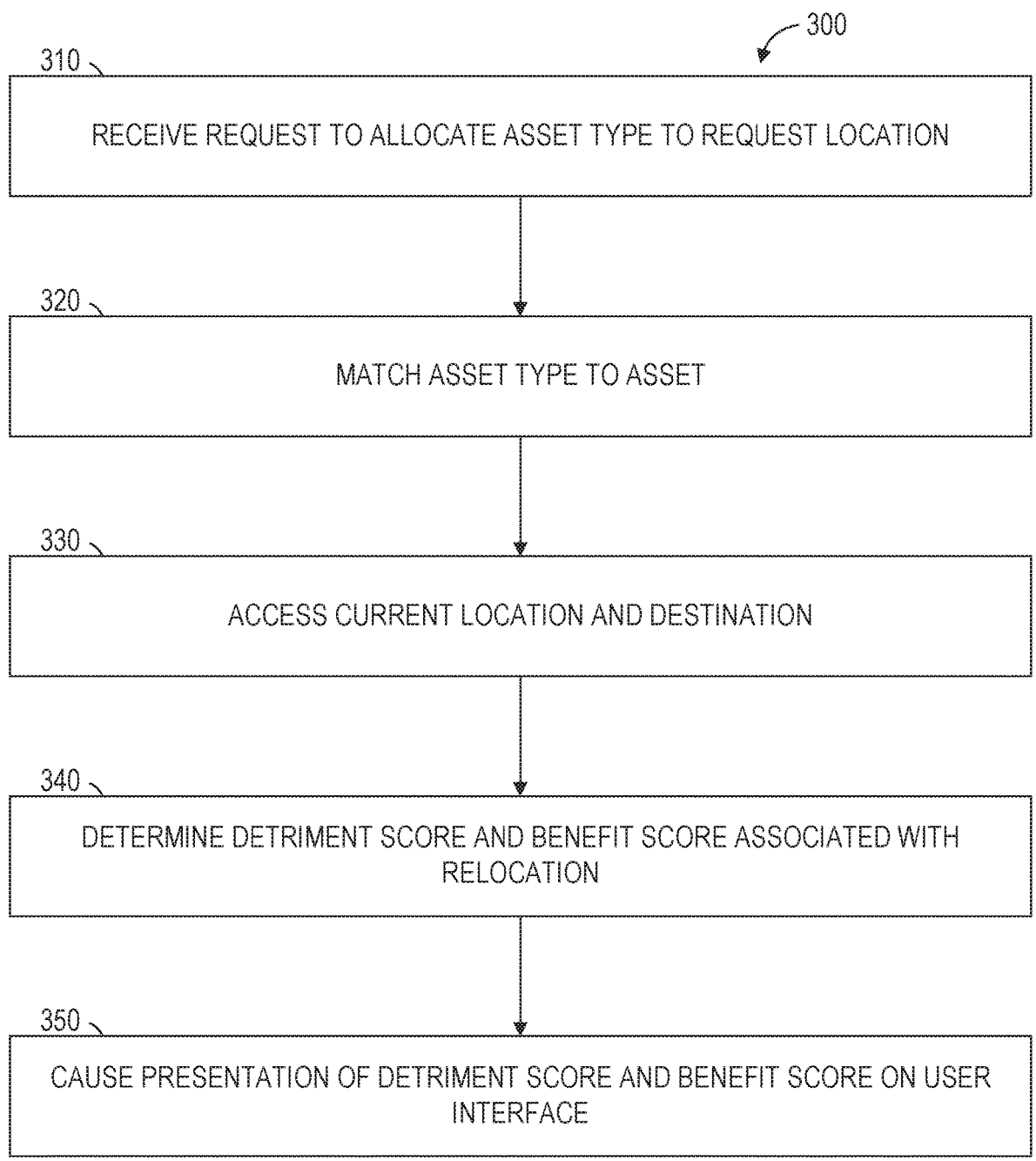
FIG. 3 is a flowchart illustrating operations of the asset allocation evaluation system, according to some example embodiment.

FIG. 3 is a flowchart illustrating operations of the asset allocation evaluation system 110, according to some embodiments. The method 300 may be embodied in computer-readable instructions for execution by one or more processors such that the operations of the method 300 may be performed in part or in whole by the network-based system 105. In particular, the operations of the method 300 may be performed in part or in whole by the asset allocation evaluation system 110; accordingly, the method 300 is described below by way of example with reference thereto. However, it shall be appreciated that at least some of the operations of the method 300 may be deployed on various other hardware configurations and the method 300 is not intended to be limited to the network-based system 105 or the asset allocation evaluation system 110.

At operation 310, the request receiver 210 receives an allocation request to allocate a quantity of a certain asset type to a request location. The allocation request is received from the client device 130 as a result of the user 132 interacting with the graphical user interface 134. The allocation request includes an asset type identifier that identifies a type of asset that is to be allocated.

At operation 320, the data receiver 220 accesses the asset database 115 and matches the asset type identifier with an asset record (e.g., a data structure including information about an asset) correlated with a specific specimen of the asset type, hereinafter known as the asset. The asset record includes the current location (e.g., a geographic location) of the asset. The data receiver 220 further accesses the schedule database 116 and matches the asset record with a schedule record. The schedule record is a data structure that includes information specifying a currently scheduled destination location of the asset (e.g., a planned location of the asset).

As an example of the operations 310-330, a construction firm needs to allocate one shovel to a demolition site in order to clean the area after a building demolition. The user 132, who in this example is a foreman, submits an allocation request for the shovel by interacting with the graphical user interface 134 located on the client device 130. The request receiver 210 receives the allocation request over the network 190. Within the allocation request, the data receiver 220 accesses the asset type identifier that designates that the allocation request is for a shovel and designates that the assets are needed at the demolition site. The data receiver 220 matches the asset type identifier with an asset record from the asset database 115. The asset record specifies "shovel" as the asset type. The data receiver 220 further accesses the current location of the asset from the asset record and identifies the current location of the shovel as at construction site A. The data receiver 220 also accesses a schedule record within the schedule database 116 that designates the destination location of the shovel. In this example, the shovel is scheduled to be transported to construction site B on the next day.

At operation 340, the effect calculator 230 determines a detriment score and a benefit score associated with fulfilling the allocation request. The effect calculator 230 determines the detriment score and the benefit score (e.g. a positive or negative number between −100 and 100 that represents a positive or a negative effect) based on information about a model distribution of assets in a location (e.g., stored in the allocation database 117). If the quantity of the asset type located at a location is less than the model distribution from the allocation database 117, the location is considered underequipped with respect to the asset type and may not be able to function as it normally would when fully equipped.

In some example embodiments, the detriment and benefit score are calculated based on one or more factors. For example, the destination location may be deprived of the asset because the asset is instead allocated to a request location. The effect calculator 230 detects, such as by accessing one or more of databases 115, 116, or 117, when the asset type at the destination location will be under the model distribution according to the allocation database 117. This would contribute to the detriment score because the destination location will be underequipped with the asset type. In a case where the request location is currently underequipped with the asset type according to the allocation database 117, the allocation of the asset to the request location would constitute a benefit, so the benefit score would be higher. The benefit score and detriment score may be calculated by aggregating other measures of benefit and detriment, such as transportation costs or savings. In an additional example, the benefit and detriment score may be calculated on the on the criticality of the equipment to each of the locations, such as the importance the asset for time-sensitive purposes as described herein, marginal benefit having the additional asset (i.e. having one shovel rather than the zero shovels makes a larger different having 10 shovels rather than nine shovels), and the availability of a substitute or partial substitute asset (e.g. a hand shovel rather than a normal shovel).

At operation 350, the effect presenter 240 causes presentation of the graphical user interface 134 on the client device 130 (e.g., by providing a set of machine-readable instructions to the client device 130) that includes a display of the detriment and benefit scores. The graphical user interface 134 may further include additional information such as information located in the asset record, the current location of the asset and the destination location of the asset.

Continuing the construction firm example from above, the shovel that is identified by the asset allocation evaluation system 110 is currently scheduled to be delivered to construction site B, but it will be allocated to the demolition site if the user 132 confirms the allocation. In the example, both construction site B and the demolition site would have less than the model number of shovels without the shovel that is subject to allocation. There would thus be a benefit to allocation because the demolition site will have an additional shovel when it is currently underequipped. However, there would also be a detriment because construction site B would become underequipped with shovels if the shovel is reallocated. In this example, the effect calculator 230 calculates both the benefit score representing the benefit of having the shovel at the demolition site and the detriment score representing the detriment of depriving construction site B of the shovel. The effect presenter 240 causes a presentation to the user 132 of the benefit score for the demolition site and the detriment score for construction site B on the client device 130 in the graphical user interface 134.

Figure 4:
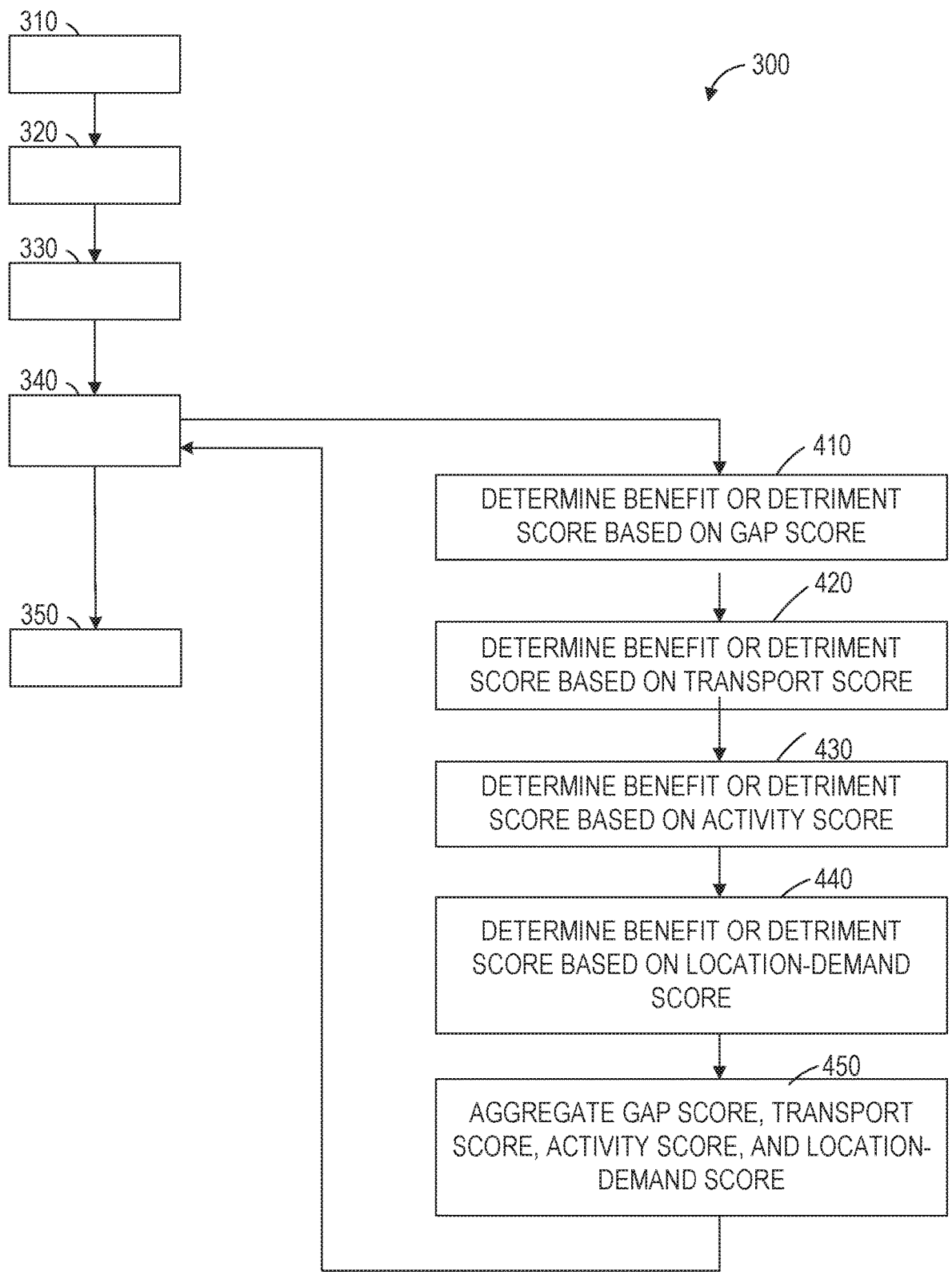
FIGS. 4 and 5 are flowcharts illustrating additional sub-operations of the asset evaluation system according to some example embodiments.
Figure 5:
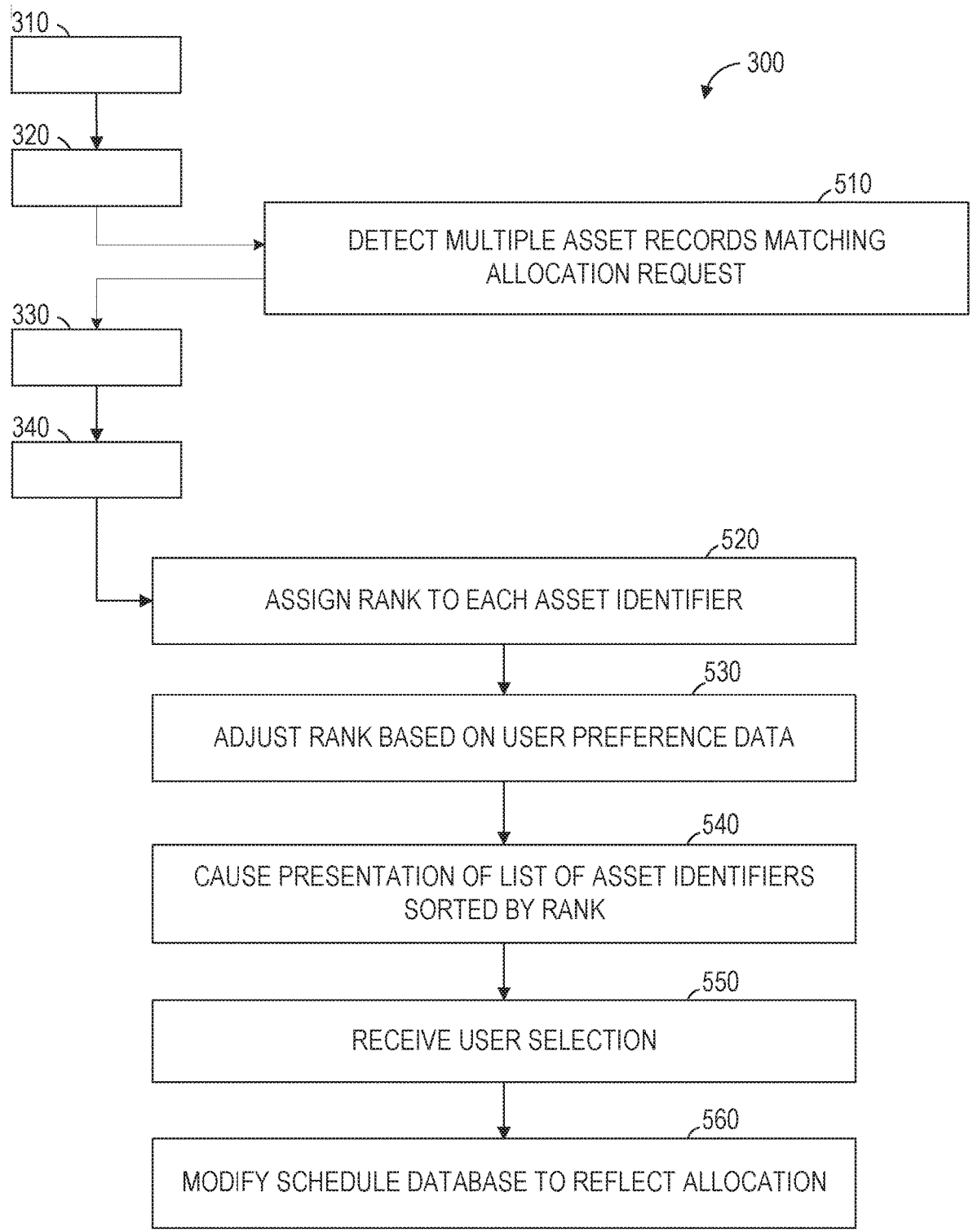

FIGS. 4 and 5 are flowcharts illustrating additional operations of the asset allocation evaluation system 110, according to some example embodiments. In some example embodiments, the method 300 includes additional sub-operations occurring within operation 340. For example, the method 300 may include operations 410, 420, 430, 440, and 450 as depicted in FIG. 4. In some example embodiments, components 210-250 perform operations 410, 420, 430, 440, and 450 included in the method 300 prior to or as part (e.g., a precursor task, a subroutine, or a portion) of operation 340 of method 300, in which the effect calculator 240 determines a detriment score and a benefit score associate with an allocation.

At operation 410, the effect calculator 230 determines a gap score. As previously described, a location is considered underequipped in an asset type if the location has less than the model quantity of the asset type that is referenced in the allocation database 117. The effect calculator 230 may determine a gap score by calculating the extent to which the quantity of the asset type at the location falls short of the quantity of the asset type that the allocation database 117 calls for. For example, a location that has only 45% of the asset type as it should according to the allocation database 117 would have a higher gap score than a location that has 95% of the asset type. A higher gap score would thus correlate to a larger detriment if assets are allocated away from the location and a larger benefit if assets are allocated to the location.

At operation 420, the effect calculator 230 determines a transport score. A transport score is determined based on the quantity of resources needed to transport the asset from one location to another location. These resources could be physical (e.g., gasoline) or monetary. A higher transport score correlates to more resources needed for transportation, and therefore a detriment. In a case where the transport score associated with transporting the asset to the destination location is higher than the transport score associated with transporting the asset to the request location, the effect calculator 230 will determine a benefit associated with allocating the asset because less resources will be needed to transport the asset to the request location.

At operation 430, the effect calculator 230 determines an activity score. In an example embodiment, the activity score is calculated by measuring the past of the asset type at a location. In another example embodiment, the activity score is calculated by measuring the current use of the asset type at a location. In both of these examples, a high usage score designates a higher usage of the asset type in a location, and a lower usage score indicates that the asset is not frequently used.

For example, if a red van is used 8 times a day and for a total of 3 hours to transport personnel at a first work site, the red van would have a higher usage score than a yellow van that is used once a day for one hour to transport personnel at a second work site. Allocating an asset to a location where the asset type is used more indicates that there is a benefit to having the asset in the location, so the effect calculator 230 would correlate to a high activity score for the request location and would contribute to the benefit score. Conversely, allocating an asset away from a location having a high activity score would correlate to a detriment.

At operation 440, the effect calculator 230 determines location-demand score by calculating the likelihood of future use of the asset at the request location and the destination location. The location-demand score operates in a similar fashion as the activity score, except instead of measuring past and current use of the asset type, the location-demand score predicts future use of the asset type.

At operation 450, the effect calculator 230 aggregates the gap score, transportation score, activity score, and location-demand score into a detriment score or a benefit score. For example, the effect calculator 230 may aggregate four scores out of 100 (gap score, transportation score, activity score, and location-demand score) and then divide the sum by four in order to derive an overall score out of 100. In more complex examples, a specific score, such as the location-demand score, may be weighted differently than the other scores. For instance, before the scores are summed, the location demand score could first be multiplied by five, and after the scores are summed they are divided by nine, to give an overall score out of 100 that gives greater weight to the location-demand score.

In the construction example, the effect calculator 230 may determine a higher activity score associated with the shovel for the destination location, construction site B, because that site has used more shovels in the past. However, the effect calculator 230 may determine a higher location-demand score for the request location, the demolition site, because the demolition site will be in more need of shovels in the future. Based on these scores, and also the gap scores and transport scores associated with construction site B and the demolition site, the effect calculator 230 can determine an overall level of detriment and an overall level of benefit associated with allocating the shovel away from construction site B and to the demolition site.

In some example embodiments, the method 300 may include operations 510, 520, 530, 540, 550, and 560, as depicted in FIG. 5. At operation 510, the data receiver 220 matches the asset type identifier to multiple other asset records. The other asset records correspond to the same asset type as the asset type identifier. The method 300 then continues with the effect calculator 230 calculating the benefit score and detriment score of allocating the asset correlated with the first asset record as well as ranking the benefits and detriments of allocating the assets correlated with the other asset records.

At operation 520, the effect presenter 240 assigns a rank to each of the asset records (e.g., the first asset record and each of the other asset records) based on the benefit scores and detriment scores associated with allocating the asset to the request location and away from the destination location. Additionally, at operation 530, the effect presenter 240 adjusts the rank based on user preference data. For example, the user 132 may choose to filter out the transport score as a factor in determining the overall benefit score and detriment score. Thus, in this example, the effect presenter 240 would determine the ranking based on other measures of benefit or detriment, such as the gap score, activity score, or future-demand score.

At operation 540, the effect presenter 240 causes the graphical user interface 134 to display the asset records in an ordered list based on the ranking. The graphical user interface 134 may further allow the user 132 to interact with the client device 130 and make a selection of one of the asset records on the graphical user interface 134.

At operation 550, the schedule adjustor 250 receives the user selection and at operation 560, modifies the schedule record within the schedule database 116 to reflect the allocation of the asset to the request location and away from the destination location. In the construction example, after being presented with a ranking of all shovels available to be allocated to the demolition site, along with benefit scores and detriment scores associated with each potential allocation, the foreman selects the shovel currently located at construction site A. The schedule adjustor 250 then modifies the schedule datable 116 to change the destination location from construction site B to the demolition site.

Figure 6:
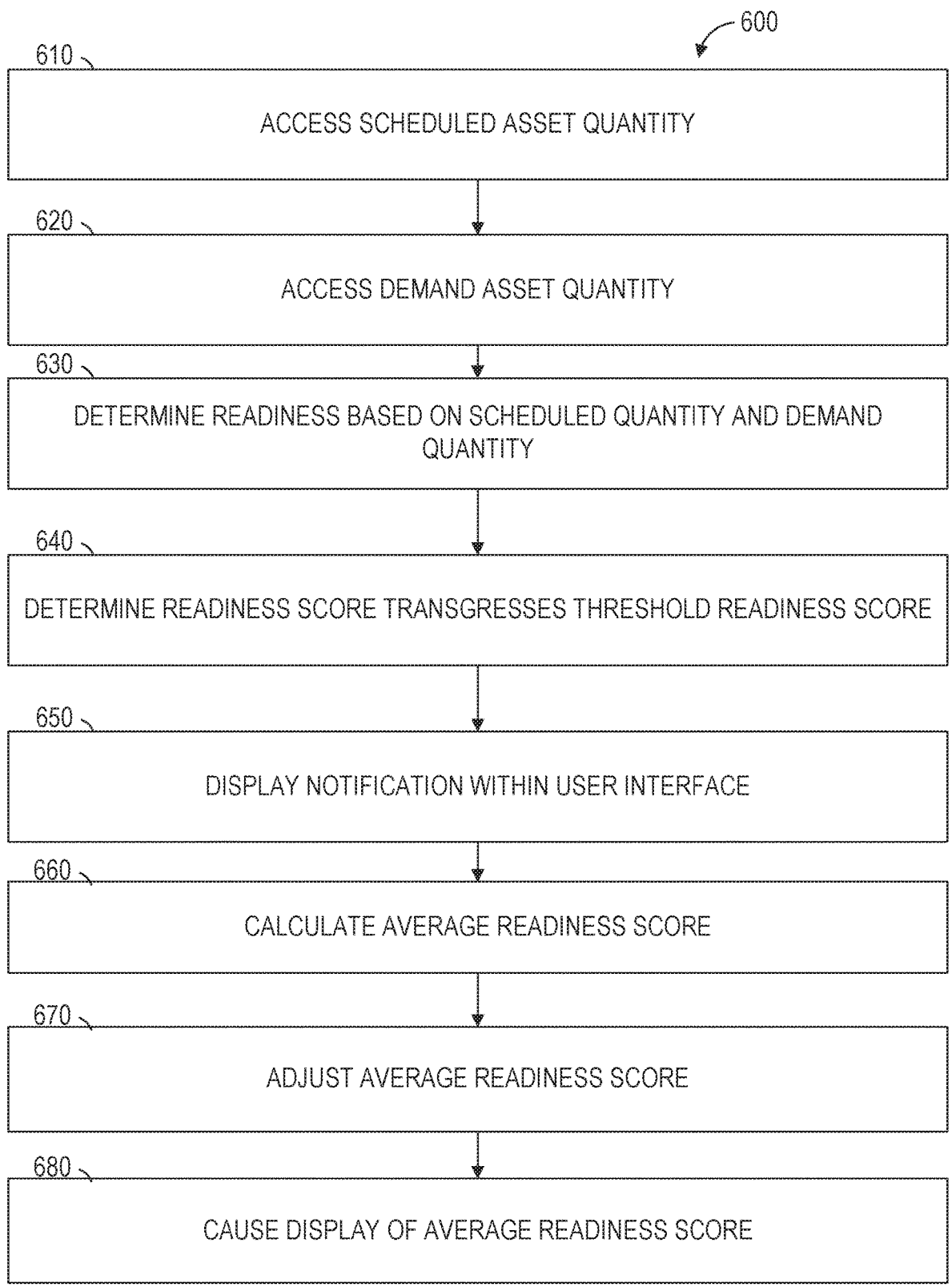
FIG. 6 is a flowchart illustrating operations of the asset allocation evaluation system, according to some embodiments.

FIG. 6 is a flowchart illustrating a method 600 for alert notification display, according to some embodiments. The method 600 may be embodied in computer-readable instructions for execution by one or more processors such that the operations of the method 600 may be performed in part or in whole by the network-based system 105. In particular, the operations of the method 600 may be performed in part or in whole by the asset allocation evaluation system 110; accordingly, the method 600 is described below by way of example with reference thereto. However, it shall be appreciated that at least some of the operations of the method 600 may be deployed on various other hardware configurations and the method 600 is not intended to be limited to the network-based system 105 or the asset allocation evaluation system 110.

At operation 610, the schedule receiver 260 accesses a scheduled asset quantity comprising a quantity of an asset type available to a location at a designated time. The scheduled asset quantity may be included in =an allocation request for an asset type at the location and at the designated time. Alternatively, the schedule receiver 260 may access the scheduled asset quantity from a data structure associated with the asset type.

At operation 620, the demand receiver 270 accesses a historic demand quantity from data structures such as databases 115, 116, and 117. The historic demand quantity is based on a forecast of the quantity of the asset type that will be required by the location at the designated time, the forecast based on past use of the asset by the location or similar locations. In some embodiments, future demand is also included in the historic demand quantity based on a forecast of the asset demand in light of external planned changes. For example, a planned initiative to build five more structures than last year at a location can cause the historic demand for shovels to increase based on the planned change.

At operation 630, the alert calculator 280 compares the scheduled asset quantity and the historic demand quantity to determine a readiness score. For example, a first instance where the scheduled asset quantity that is a more similar quantity to the historic demand quantity may cause the alert calculator to determine a high readiness score. Alternatively, a second instance where the scheduled asset quantity is a much lower quantity than the historic demand quantity may cause the alert calculator to determine a low readiness score. For example, the score could be as a percentage of a model level of access to the asset type. For this example, a score of 0.5 would represent that 50% of the asset type can be accessed where the model level of access is 100%. Similarly, a score of 1.5 would represent that 150% of the asset can be accessed. Alternatively, the scores can be calculated directly as percentages, such as 50% or 150%.

At operation 640, the alert calculator 280 determines that the readiness score calculated transgresses a threshold readiness score. The threshold readiness score may be a maximum readiness score or a minimum readiness score. Thus, the readiness score may be considered to transgress the threshold readiness core by exceeding a maximum readiness score, or by falling below a minimum readiness score.

At operation 650, in response to the threshold readiness score being transgressed, the alert presenter 290 displays a notification within the graphical user interface 134. The alert notification is viewable by the user 132, and may further display additional information such as the readiness score to the user 132.

Continuing the above construction example, construction site C may enter a phase starting in July where a mortar compound must be mixed on-site, and requires twice as many shovels as normally required. The schedule receiver 260 accesses the asset database 115 to determine the quantity of shovels that will be available to construction site C starting in July. The demand receiver 270 accesses the number of shovels that are typically needed for similar construction sites to mix the mortar compound. The demand receiver 270 also receive additional demand data to forecast the historic demand for the site, such as amount of mortar needed to be mixed and seasonable variability, among other factors.

In the example, the alert calculator 280 compares the scheduled availability of shovels for construction site C in July and the historic demand for shovels as accessed by the demand receiver 270. The alert calculator 280 then determines a readiness score based on the comparison. In this example, the historic demand quantity may be 25 shovels and the scheduled quantity is 17. In this embodiment, these numbers may yield a readiness score of 68, since 17 divided by 25 yields 0.68 or 68%. In another example, additional factors involving the criticality of the asset are taken into account. For example, when the historic demand quantity is 25 shovels and the scheduled quantity is 20 shovels, the readiness score may be an 80 as opposed to when the scheduled quantity is 10 shovels and the readiness score is 30. The much larger drop in readiness score compared to number of shovels below the historic demand quantity is caused by an increased detriment for each shovel under the historic demand quantity. In another example, the first location may only have 19 shovels but receive a readiness score of 90 because there are hands shovels available, which are partial substitute for normal shovels.

The alert calculator 280 then determines if this readiness score transgresses the threshold readiness score. In this example, if the threshold readiness score is 90, then a score of 68 would transgress the threshold readiness score by being too low. Finally, the alert calculator 280 transmits an alert to the alert presenter 290 about the transgression of the readiness threshold. The alert presenter 290 then displays a notification on the graphical user interface 134 of the client device 130 to inform a foreman responsible for construction site C about the upcoming shortfall.

Operations 660-680 may further calculate, adjust and display an average readiness score based on the readiness score determined at operation 630. At operation 660, the status adjustor 295 calculates an average readiness score for an asset type based on the readiness scores for a plurality of locations. At operation 670, the status adjustor adjusts the average readiness score based on the readiness score determined at operation 630 if the user 132 initiates a user allocation input. At operation 680, the alert presenter 290 may display the average readiness score to the user 132 using the graphical user interface 134 on the client device 130. In this example, the alert presenter 290 presents the readiness score of the location concurrently on the graphical user interface 134 of the client device 130 with the average readiness score of all locations, allowing the user 132 to compare the readiness of the currently viewed location with the average readiness of all locations.

Figure 7:
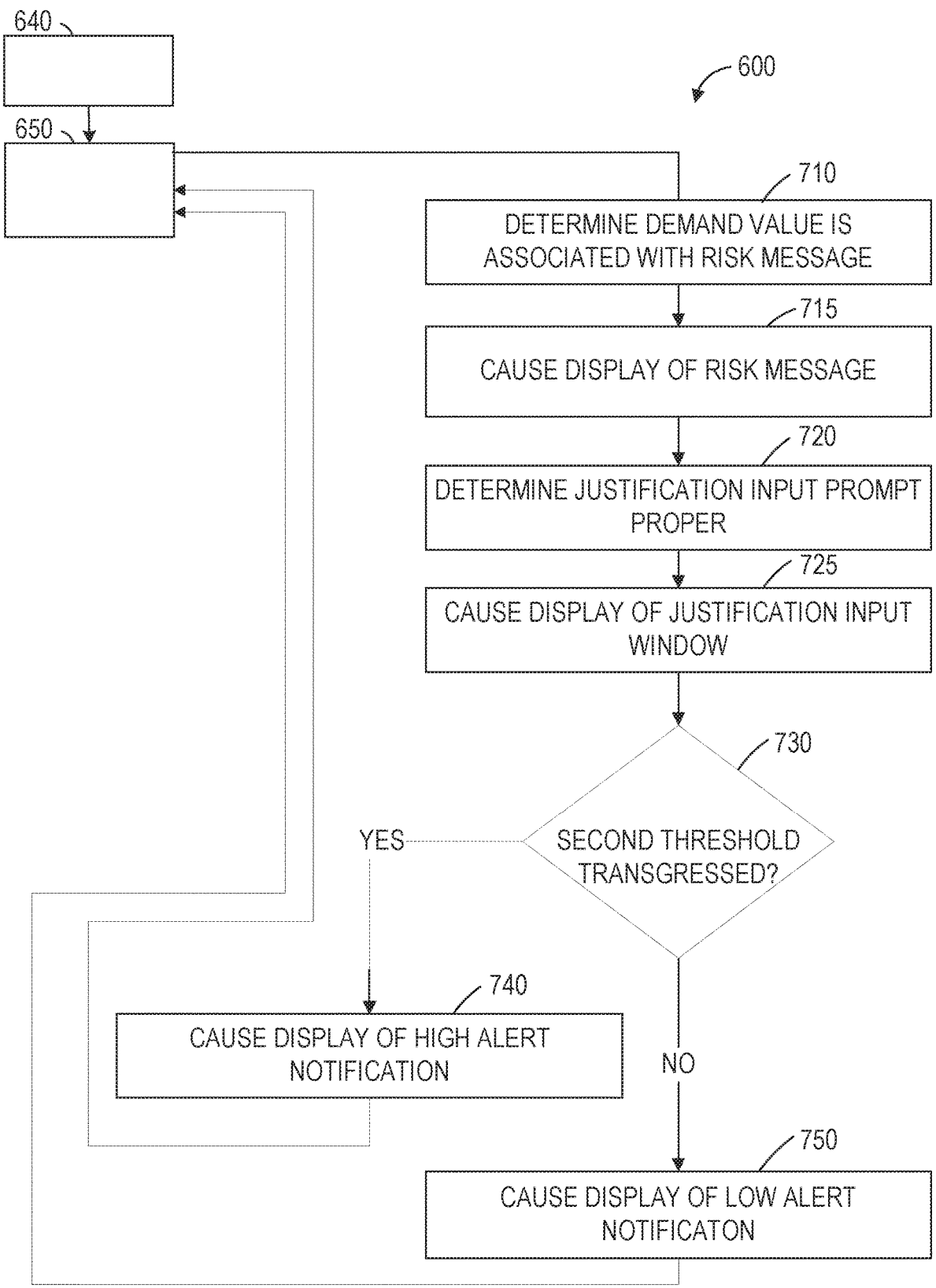
FIGS. 7 and 8 are flowcharts illustrating additional sub-operations of the asset evaluation system, according to some example embodiments.
Figure 8:
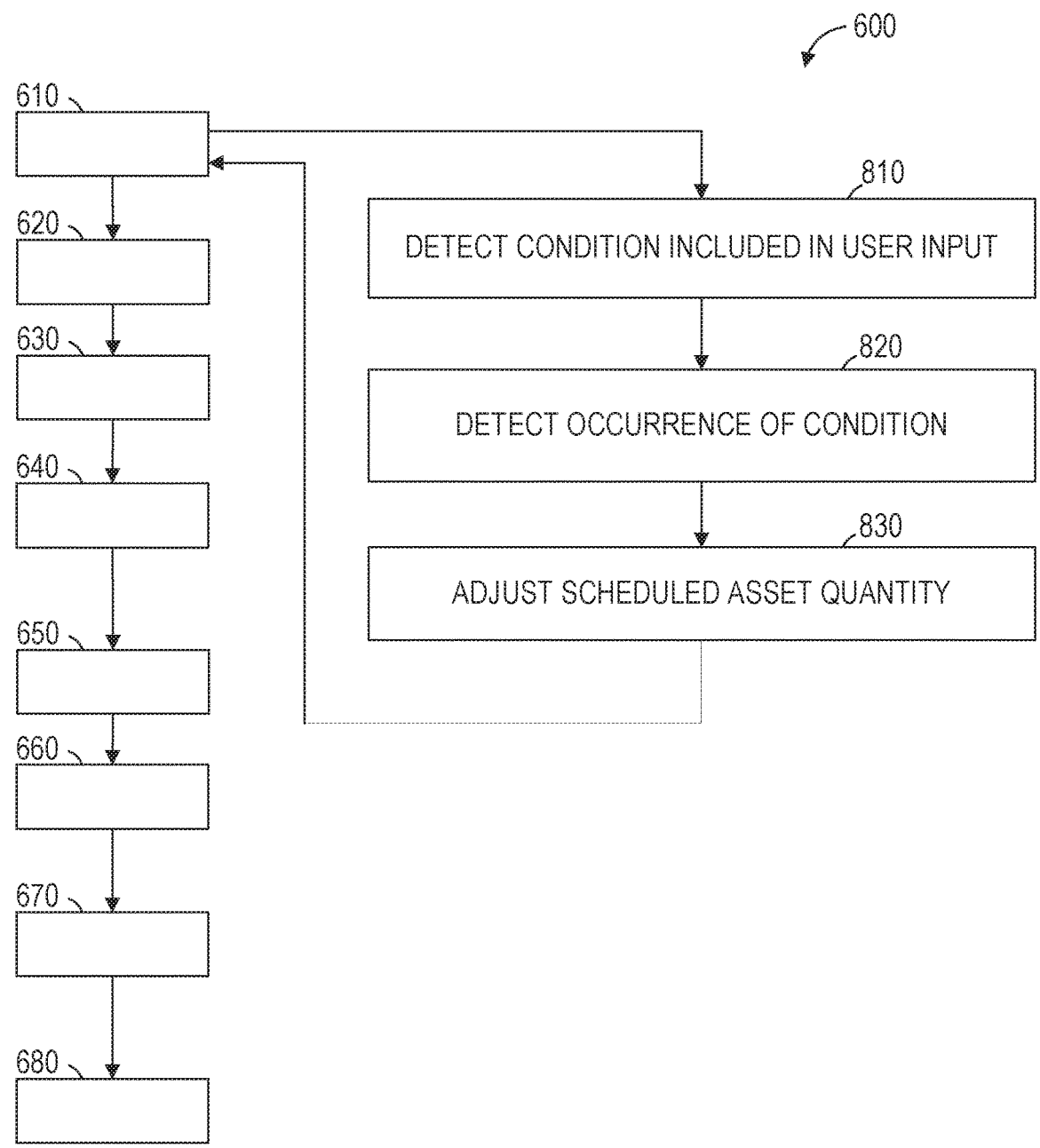

FIGS. 7 and 8 are flowcharts illustrating additional operations of the asset allocation evaluation system 110, according to some example embodiments. In some example embodiments, the method 600 includes additional sub-operations occurring within operation 340. For example, the method 600 may include a combination of operations 710, 720, 730, 740, and 750 as depicted in FIG. 7. In some example embodiments, the components 260-295 perform operations 710, 720, 730, 740, and 750 included in the method 300 prior to or as part (e.g., a precursor task, a subroutine, or a portion) of operation 650 of method 600, in which the alert presenter 290 presents an alert notification to the user 132 on the graphical user interface 134 on the client device 130.

At operation 710, the alert generator 280 determines, by accessing data stored on a database such as databases 115, 116, and 117, that a risk message is associated with the historic demand quantity of the asset type that is needed by the location at the designated time. At operation 715 the risk message is displayed to the user 132 on the graphical user interface 134 on the client device 132. A risk message may be a display window that displays a notification to the user 132 of a consequence that is specifically caused or more likely to be caused by a difference between the scheduled quantity and the historic demand quantity of the asset type. In some embodiments, the alert generator 280 can further access additional data stored on databases 115, 116, and 117 that includes a risk mitigation message associated with the risk message. The alert presenter 290, can further transmit the mitigation message for display to the user 132 on the graphical user interface 134 of the client device 132. The risk mitigation message can, for example include alternative options to correct or lessen the risk, such as allocation of a substitute asset where there is a shortfall.

For example, if construction site C has a shortfall in worker hard hats in July, this not only presents a risk of the site being under-equipped compared to the determined historic demand quantity, but also presents a safety hazard for the workers. The historic demand quantity of worker hard hats for construction site C in July can thus correlated with a risk message that displays the phrase "This shortfall will cause a personnel safety violation." This message can be accessed by the alert generator 280, which transmits the message to the alert presenter 290 for display to the user 132 on the graphical user interface 134 of the client device 130. The alert generator 280 can further access for presentation by the alert presenter 290, a risk mitigation message that causes display of the phrase "The personnel safety violation can be suspended if visitor hard hats are designated as substitute worker hard hats." In this example "visitor" hard hats are a partial substitute for worker hard hats and will transverse the safety hazard if designated as worker hard hats.

At operation 720, the alert generator 280 determines, by accessing data associated with the historic demand quantity of the asset type that is needed by the location at the designated time and stored on a database such as databases 115, 116, and 117, that the user 134 should be prompted to input a justification into a justification window. At operation 725, the alert presenter 290 displays a justification window on the graphical user interface 134 of the client device 130 for the user 132 to input a text justification for the threshold readiness score being transgressed. A justification window may further be prompted in response to a user input that causes the scheduled quantity to differ from the historic demand quantity. For the construction example above, a high alert may be generated because only 14 shovels will be available when 25 are historically demanded, the foreman may be prompted to input a justification for why the construction site will be under-equipped in July. The foreman may input a justification that reads "New quick-set mortar does not require shovels."

At decision block 730 the alert generator 280 determines whether the readiness score transgresses a second readiness threshold. At operation 740, responsive to the alert generator 280 determining the readiness score transgresses the second threshold readiness score, the alert presenter 290 causes display of a "high alert" message to the user 132 on the graphical user interface 134. Alternatively at 750, responsive to the readiness score transgressing the threshold readiness score, the alert presenter 290 displays a "low alert" notification to the user 132 on the graphical user interface 134.

Continuing the above example of construction site C, the number of shovels available to construction site C in July may cause the alert presenter 290 to display a high alert if only 14 shovels will be available. On the other hand, the alert presenter 290 may display a low alert if 18 shovels will be available.

Method 600 may further include operations 810-830 as part of operation 610. In operation 810, the schedule receiver 260 determines, by accessing an allocation input received from the user, that the allocation input is based, at least partially, on a condition occurring. For example, the schedule receiver may receive a user allocation input from the foreman that designates 25 shovels will be made available to construction site C in July if the foundation has been set by June 15$^{th}$. The scheduled availability of 25 shovels is therefore based on the fulfillment of the condition that the foundation be set by June 15$^{th}$.

In operation 820 and 830, the schedule receiver 260 receives an indication, via a user input or other method, that the condition has been fulfilled and, responsive to the fulfillment, adjusts the scheduled quantity of the asset type to include the user allocation input. Continuing above example, the foreman or another user inputs that the foundation has been set on June 13$^{th}$. The schedule receiver 260 detects that the foundation has been set prior to June 15$^{th}$, and, according to the condition, the schedule receiver adjusts the scheduled quantity of shovels to reflect the additional 25 shovels.

FIG. 9 is an illustration depicting the graphical user interface 134 on the client device 130 that displays to a user different options for allocating assets from various locations, along with a level of detriment experienced by each location. Included is a list of asset records 910 that correspond to individual assets, which in this case are earplugs. The user 132 can select the asset records 910 with location titles 960 by touching a check box next to the location and selecting a quantity to allocate. Also included are options 920 and 930 to purchase (acquire) (option 920) additional earplugs instead of allocating them away from other locations, or deny (option 930) the allocation. Displayed next to each location in the asset records 910 is a detriment display bar 940 indicating the detriment score representing the detriment experienced by each location if earplugs are allocated away from the location. As shown, the location titles 960 are presented in descending order according to detriment score. Also included is a fulfillment gauge 950, which is a user interface element that indicates how much of the allocation request has been fulfilled.

Figure 10:
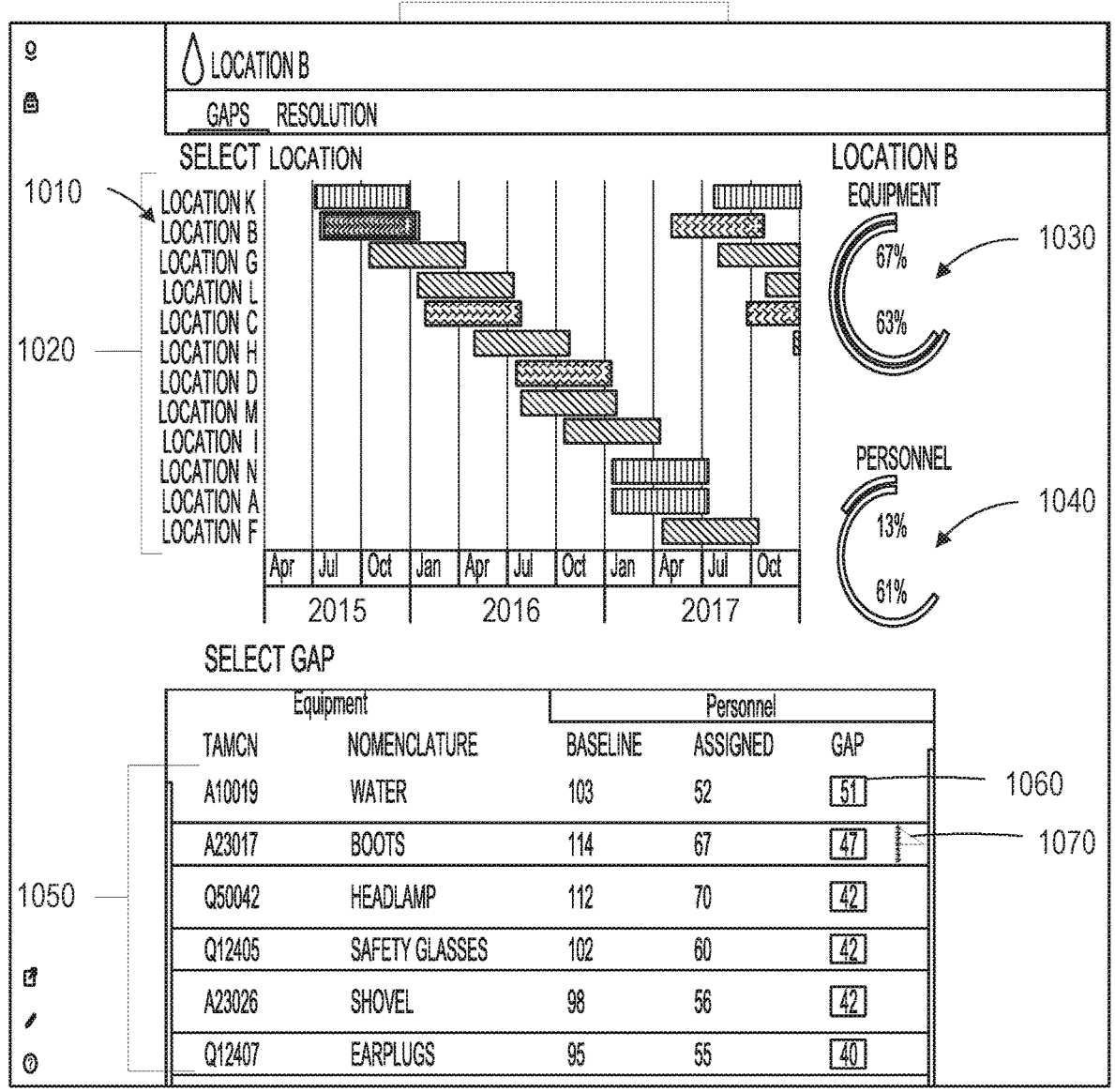
FIG. 10 is an interface diagram depicting a user interface that displays a status of a location based on assets allocated and the overall need for each asset, according to some example embodiments.

FIG. 10 is an illustration depicting the graphical user interface 134 that displays to the user 130 the scheduled status of a location based on assets allocated and the overall need for each asset. As shown, a location 1010 ("Location B") is presented along with a list 1020 of multiple scheduled locations. The graphical user interface 134 displays an equipment gauge 1030 and a personnel gauge 1040 associated with the location 1010. The outer ring depicted on the equipment gauge 1030 and the personnel gauge 1040 reflects how equipped Location B will be regarding asset type (including personnel type) compared to the model distribution from the allocation database 117. In this case, Location B is currently scheduled to be underequipped, having 67% of the equipment and 13% of the personnel compared to the model. The equipment gauge 1030 also displays an inner ring, which compares the level of equipment with the average location. Under this metric, Location B is still underequipped, having 63% of the equipment and 61% of the personnel compared to the average location. In some embodiments, the equipment gage 1030 and personnel gage 1040 may display the readiness score of an asset type (or personnel type) at a designated time concurrently with the average readiness score for the asset type or personnel type.

Additionally, FIG. 10 shows a list 1050 of specific assets scheduled to be allocated to the location 1010. The list 1050 includes the model distribution (Baseline) of each asset from the allocation database 117 as well as the scheduled number from the schedule database 116. The difference between the asset quantities is shown as a gap score 1060. In order to eliminate or shorten gaps such as the one depicted in FIG. 10, the user 132 may allocate additional assets to the location 1010, such as on the graphical user interface 134 illustrated in FIG. 6.

Finally, FIG. 10 also shows an alert notification 1070 to show the asset type for which the readiness score transgresses the threshold readiness score. Different thresholds may be set for various asset types, and the alert notifications may be high or low alert notifications. Additionally, the user 132 may be prompted to view a risk message or input a justification in a justification window as part of the alert notification.

Figure 11:
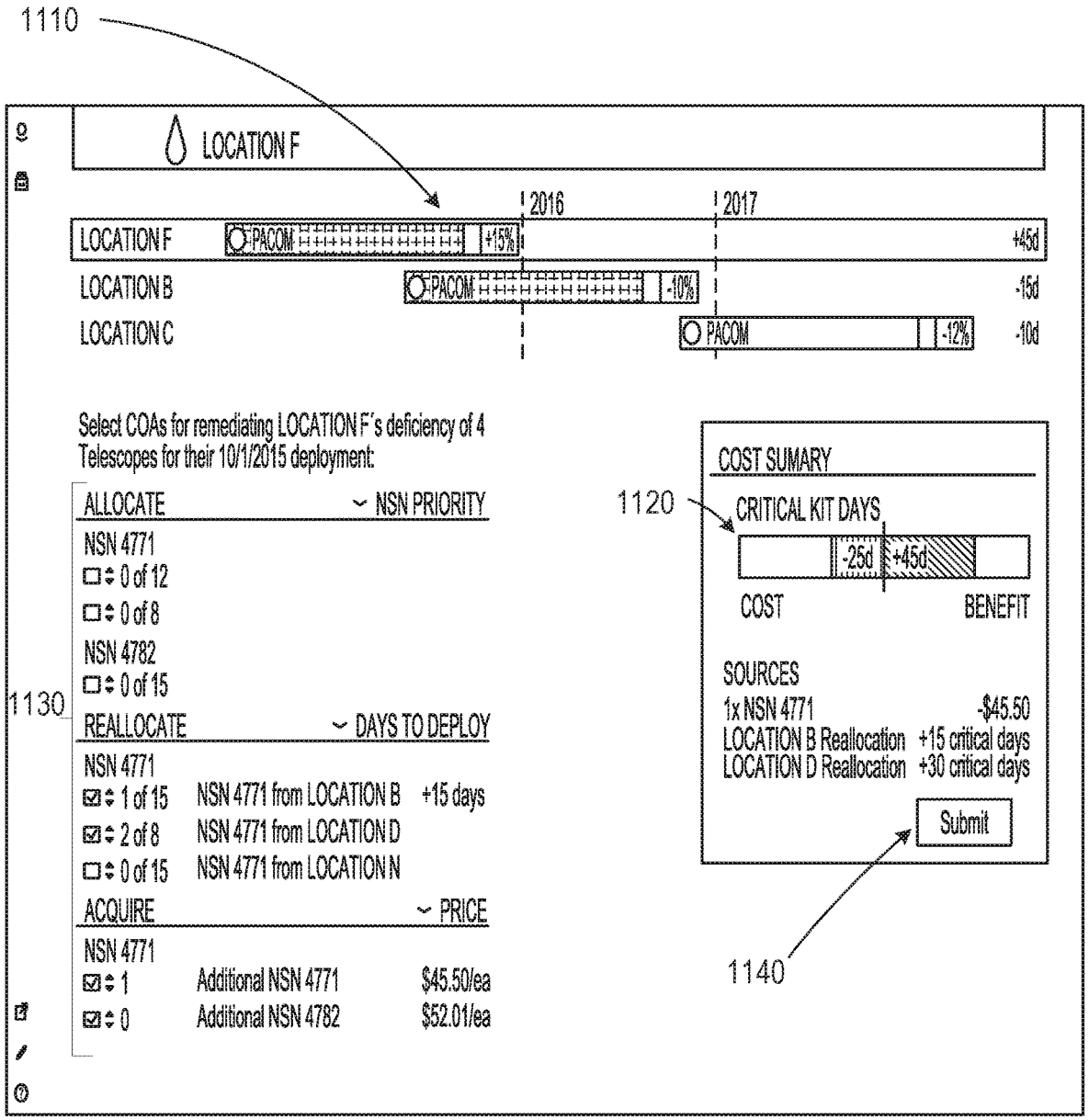
FIG. 11 is an interface diagram depicting a user interface that displays a summary of allocations to a certain location, according to some example embodiments.

FIG. 11 is an illustration depicting the graphical user interface 134 that shows a summary of allocations 1130 to a certain location as well as a summary of the benefits scores and detriment scores 1120 associated with the allocation. As shown, location 1110 ("Location F") is selected and a user is in the process of allocating telescopes to the location since "Location F" is selected and the summary of allocations 1130 include checkboxes to allocate away from other allocations. According to the summary of benefit scores and detriment scores 1120, the overall benefit score of allocating one telescope from Location B, two telescopes from Location D, and purchasing one telescope is greater than the detriments associated with the allocation (detriment score). The user 132 can then confirm the allocation by selecting "Submit" 1140, which causes the schedule adjustor 250 to modify the schedule database 116 (e.g., by updating an object associated with the asset).

When these effects are considered in aggregate, one or more of the methodologies described herein may obviate a need for certain efforts or resources that otherwise would be involved in asset allocation evaluation. Efforts expended by the user 132 in asset allocation evaluation may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 12:
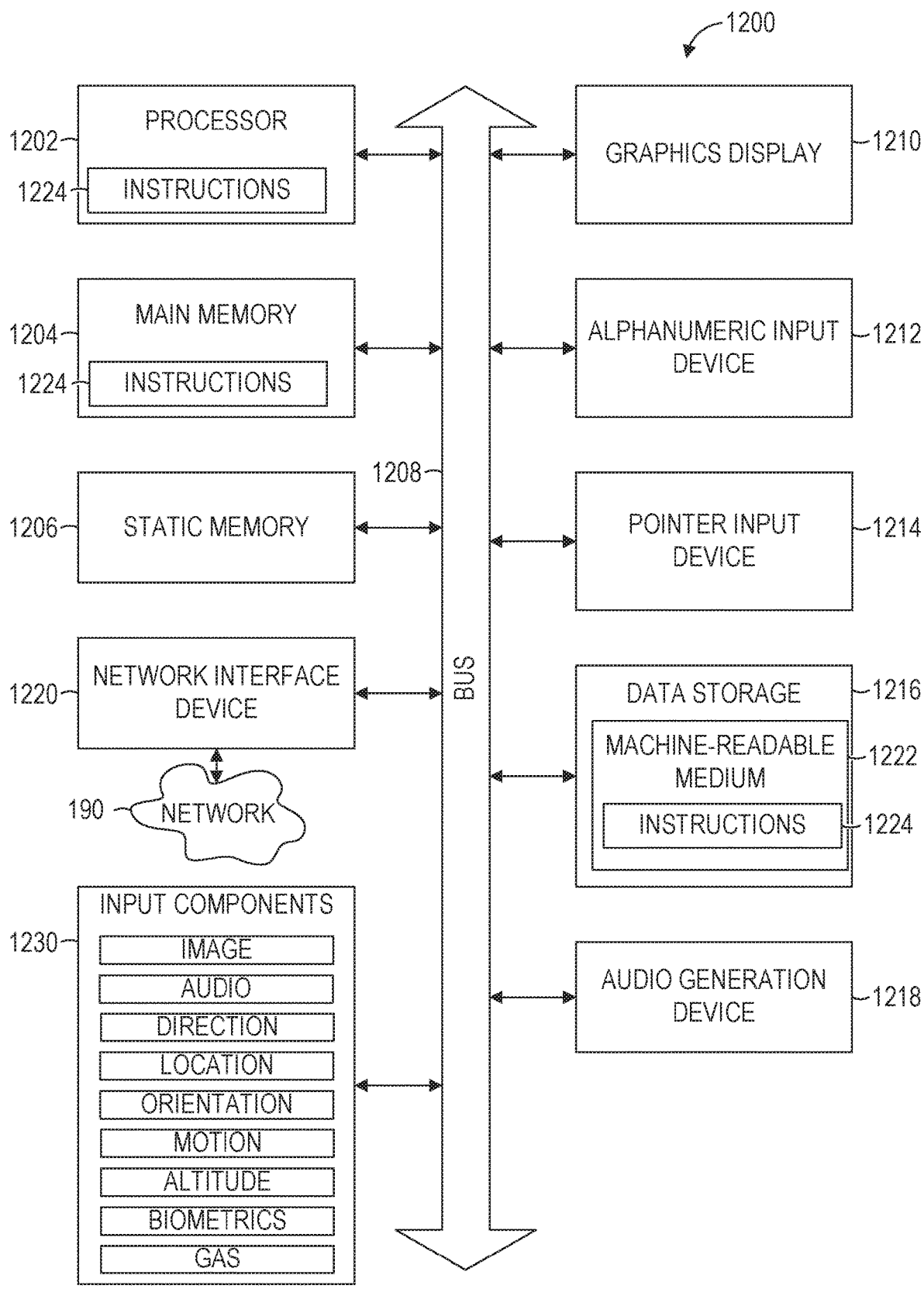
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1204, and a static memory 1206, which are configured to communicate with each other via a bus 1208. The processor 1202 contains solid-state digital microcircuits (e.g., electronic, optical, or both) that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein. In some example embodiments, the processor 1202 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1200 with at least the processor 1202, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a pointer input device 1214 (e.g., a mouse, a touchpad, a touchscreen, a trackball, a joystick, a stylus, a motion sensor, an eye tracking device, a data glove, or other pointing instrument), a data storage 1216, an audio generation device 1218 (e.g., a sound card, an amplifier, a speaker, a headphone jack, or any suitable combination thereof), and a network interface device 1220.

The data storage 1216 (e.g., a data storage device) includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the static memory 1206, within the processor 1202 (e.g., within the processor's cache memory), or any suitable combination thereof, before or during execution thereof by the machine 1200. Accordingly, the main memory 1204, the static memory 1206, and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device (e.g., a smart phone, a tablet computer, or a wearable device), and may have one or more additional input components 1230 (e.g., sensors or gauges). Examples of such input components 1230 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium (e.g., machine-readable medium 1222) able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions 1224. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1224 for execution by the machine 1200 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1224).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A server system comprising:
one or more processors of a machine; and
a memory storing instructions that, when executed by the one or more processors, causes the machine to perform operations comprising:
determining a readiness score associated with a request location based on a comparison of a scheduled quantity of an asset type at the request location and a historic demand quantity of the asset type at the request location;
in response to determining that the readiness score associated with the request location transgresses a threshold readiness score, automatically causing display of an alert notification within a user interface presented by a client device, the alert notification being displayed in the user interface with an indicator of a deficiency in the scheduled quantity of the asset type at the request location determined based on the comparison of the scheduled quantity to the historic demand quantity;

in response to receiving a request to reallocate a first quantity of the asset type to the request location, calculating detriment scores associated with reallocating the first quantity of the asset type from a set of source locations to the request location, wherein each detriment score is calculated based on a model distribution that specifies a baseline quantity of the asset type associated with a respective source location, each detriment score providing a measure of detriment to the respective source location caused by reallocation of a portion of the first quantity of the asset type from the respective source location to the request location;

causing the user interface presented by the client device to display:
- a listing of the set of source locations,
- the detriment score calculated for each respective source location; and
- an input element for initiating reallocation of the first quantity of the asset type from the set of source locations to the request location;

receiving from the client device, an input submitted via the input element displayed in the user interface presented by the client device; and in response to receiving the input, initiating the reallocation of the first quantity of the asset type from the set of source locations to the request location and causing the user interface to a update a fulfillment indicator to indicate a portion of the deficiency in the scheduled quantity of the asset type at the request location that is fulfilled based on reallocation of the first quantity of the asset type from the set of source locations to the request location.

2. The system of claim 1, wherein the calculating of the detriment scores includes determining a transport score based on an amount of resources needed to reallocate the first quantity of the asset type from the set of source locations to the request location.

3. The system of claim 1, wherein the calculating of the detriment scores includes determining an activity score that reflects activity of an asset at a current location of the asset.

4. The system of claim 1, wherein the calculating of the detriment scores includes determining a maintenance score based on a current state of repair of one or more assets of the asset type.

5. The system of claim 1, wherein the calculating of the detriment scores includes determining a location-demand score based on a first prospective future demand of the asset type corresponding to the request location and a second prospective future demand of the asset type corresponding to a source location.

6. The system of claim 1, the operations further comprising:
determining a benefit score associated with reallocation of the first quantity of the asset type from the set of source locations to the request location, the benefit score providing a measure of benefit to the request location associated with reallocation of the first quantity of the asset type from the set of source locations to the request location; and
causing presentation of the benefit score within the user interface.

7. The system of claim 1, wherein initiating the reallocation of the first quantity of the asset type from the set of source locations to the request location comprises:

modifying a schedule record to reflect the reallocation of the first quantity of the asset type from the set of source locations to the request location.

8. The system of claim 1, wherein the user interface comprises a table that includes a list of asset types allocated to the request location, a baseline quantity for each asset type, an allocated quantity for each asset type, and a gap quantity for each asset type.

9. A method comprising:
determining a readiness score associated with a request location based on a comparison of a scheduled quantity of an asset type at the request location and a historic demand quantity of the asset type at the request location;

in response to determining that the readiness score associated with the request location transgresses a threshold readiness score, automatically causing display of an alert notification within a user interface presented by a client device, the alert notification being displayed in the user interface with an indicator of a deficiency in the scheduled quantity of the asset type at the request location determined based on the comparison of the scheduled quantity to the historic demand quantity;

in response to receiving a request to reallocate a first quantity of the asset type to the request location, calculating detriment scores associated with reallocating the first quantity of the asset type from a set of source locations to the request location, wherein each detriment score is calculated based on a model distribution that specifies a baseline quantity of the asset type associated with a respective source location, each detriment score providing a measure of detriment to the respective source location caused by reallocation of a portion of the first quantity of the asset type from the respective source location to the request location;

causing the user interface presented by the client device to display:
- a listing of the set of source locations,
- the detriment score calculated for each respective source location; and
- an input element for initiating reallocation of the first quantity of the asset type from the set of source locations to the request location;

receiving from the client device, an input submitted via the input element displayed in the user interface presented by the client device; and in response to receiving the input, initiating the reallocation of the first quantity of the asset type from the set of source locations to the request location and causing the user interface to update a fulfillment indicator to indicate a portion of the deficiency in the scheduled quantity of the asset type at the request location that is fulfilled based on reallocation of the first quantity of the asset type from the set of source locations to the request location.

10. The method of claim 9, wherein the calculating of the detriment scores includes determining a transport score based on an amount of resources needed to reallocate the first quantity of the asset type from the set of source locations to the request location.

11. The method of claim 9, wherein the calculating of the detriment scores includes determining an activity score that reflects activity of an asset at a current location of the asset.

12. The method of claim 9, wherein the calculating of the detriment scores includes determining a maintenance score based on a current state of repair of one or more assets of the asset type.

13. The method of claim 9, wherein the calculating of the detriment scores includes determining a location-demand score based on a first prospective future demand of the asset type corresponding to the request location and a second prospective future demand of the asset type corresponding to a source location.

14. The method of claim 9, further comprising:
determining a benefit score associated with reallocation of the first quantity of the asset type from the set of source locations to the request location, the benefit score providing a measure of benefit to the request location associated with reallocation of the first quantity of the asset type from the set of source locations to the request location; and
causing presentation of the benefit score within the user interface.

15. The method of claim 9, wherein initiating the reallocation of the first quantity of the asset type from the set of source locations to the request location comprises:
modifying a schedule record to reflect the reallocation of the first quantity of the asset type from the set of source locations to the request location.

16. The method of claim 9, wherein the user interface comprises a table that includes a list of asset types allocated to the request location, a baseline quantity for each asset type, an allocated quantity for each asset type, and a gap quantity for each asset type.

17. A non-transitory computer-readable medium storing instructions that, when executed by one or more computer processors of one or more computing devices, cause the one or more computing devices to perform operations comprising:
determining a readiness score associated with a request location based on a comparison of a scheduled quantity of an asset type at the request location and a historic demand quantity of the asset type at the request location;
in response to determining that the readiness score associated with the request location transgresses a threshold readiness score, automatically causing display of an alert notification within a user interface presented by a client device, the alert notification being displayed in the user interface with an indicator of a deficiency in the scheduled quantity of the asset type at the request location determined based on the comparison of the scheduled quantity to the historic demand quantity;
in response to receiving a request to reallocate a first quantity of the asset type to the request location, calculating detriment scores associated with reallocating the first quantity of the asset type from a set of source locations to the request location, wherein each detriment score is calculated based on a model distribution that specifies a baseline quantity of the asset type associated with a respective source location, each detriment score providing a measure of detriment to the respective source location caused by reallocation of a portion of the first quantity of the asset type from the respective source location to the request location;
causing the user interface presented by the client device to display:
a listing of the set of source locations,
the detriment score calculated for each respective source location; and
an input element for initiating reallocation of the first quantity of the asset type from the set of source locations to the request location;
receiving from the client device, an input submitted via the input element displayed in the user interface presented by the client device; and
in response to receiving the input, initiating the reallocation of the first quantity of the asset type from the set of source locations to the request location and causing the user interface to update a fulfillment indicator to indicate a portion of the deficiency in the scheduled quantity of the asset type at the request location that is fulfilled based on reallocation of the first quantity of the asset type from the set of source locations to the request location.

* * * * *